(12) United States Patent
Spitale

(10) Patent No.: US 6,814,682 B2
(45) Date of Patent: Nov. 9, 2004

(54) TRANSFER CASE WITH SYNCHRONIZER CLUTCH

(75) Inventor: Ralph J. Spitale, West Bloomfield, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 10/141,523

(22) Filed: May 7, 2002

(65) Prior Publication Data

US 2003/0211913 A1 Nov. 13, 2003

(51) Int. Cl.[7] ................ B60K 17/344; F16H 37/08; F16H 37/02
(52) U.S. Cl. ................ 475/222; 475/205; 475/210; 180/248
(58) Field of Search .................. 475/204, 205, 475/206, 210, 213, 219; 180/248, 249, 251

(56) References Cited

U.S. PATENT DOCUMENTS

| | | | |
|---|---|---|---|
| 4,561,520 A | 12/1985 | Fogelberg | 180/247 |
| 4,714,129 A | 12/1987 | Mueller | 180/248 |
| 4,779,699 A | 10/1988 | Hatano | 180/248 |
| 4,781,266 A | 11/1988 | Hotta et al. | 180/248 |
| 4,854,413 A | 8/1989 | Kameda et al. | 180/247 |
| 5,443,426 A | 8/1995 | Frost | 475/91 |
| 5,520,590 A | 5/1996 | Showalter et al. | 475/295 |
| 5,613,587 A * | 3/1997 | Baxter, Jr. | 192/53.32 |
| 5,643,129 A | 7/1997 | Richardson | 475/204 |
| 5,655,986 A | 8/1997 | Wilson et al. | 475/204 |
| 5,697,861 A * | 12/1997 | Wilson | 475/198 |
| 5,700,222 A | 12/1997 | Bowen | 475/204 |
| 5,702,321 A * | 12/1997 | Bakowski et al. | 475/199 |
| 5,704,866 A * | 1/1998 | Pritchard et al. | 475/206 |
| 5,832,777 A | 11/1998 | Weilant | 74/335 |
| 5,845,754 A | 12/1998 | Weilant | 192/53.35 |
| 5,853,342 A * | 12/1998 | Pritchard et al. | 475/206 |
| 5,885,182 A * | 3/1999 | Forsyth | 475/198 |
| 5,890,986 A * | 4/1999 | Pritchard et al. | 475/206 |
| 5,902,205 A * | 5/1999 | Williams | 475/204 |
| 5,947,858 A * | 9/1999 | Williams | 475/206 |
| 6,113,512 A * | 9/2000 | Williams | 475/204 |
| 6,152,848 A * | 11/2000 | Williams et al. | 475/204 |
| 6,203,465 B1 | 3/2001 | Showalter | 475/204 |
| 6,230,577 B1 | 5/2001 | Showalter et al. | 74/337.5 |
| 6,251,045 B1 | 6/2001 | Oliveira et al. | 477/124 |

OTHER PUBLICATIONS

Socin, Richard J. and Walters, L. Kirk; "Manual Transmission Synchronizers".

* cited by examiner

Primary Examiner—Tisha Lewis
(74) Attorney, Agent, or Firm—Warn, Hoffmann, Miller & LaLone, P.C.; Greg Dziegielewski

(57) ABSTRACT

A transfer case for a vehicle that allows shifting between AWD and two-wheel drive at any vehicle speed. The transfer case includes a center differential employing pinion and sun gears that allow a front drive shaft and a rear drive shaft to turn at different speeds to provide the all-wheel drive function. The transfer case further includes an electrically actuated synchronizer assembly that allows the speed of the front drive shaft to be synchronized to the speed of the rear drive shaft when shifting from two-wheel drive to all-wheel drive to provide the shift on the fly function. The synchronizer assembly also includes a neutral position where both the front drive shaft and the rear drive shaft are not engaged to the vehicle transmission to allow for vehicle towing.

21 Claims, 3 Drawing Sheets

TRANSFER CASE WITH SYNCHRONIZER CLUTCH

BACKGROUND OF THE INVENTION

1. Field of the Invention

This invention relates generally to a transfer case for an all-wheel drive (AWD) vehicle and, more particularly, to a transfer case for an AWD vehicle, where the transfer case includes a center differential and a synchronizer to allow shifting between all-wheel drive and two-wheel drive at any vehicle speed.

2. Discussion of the Related Art

Various sport utility vehicles (SUV), off-road vehicles, four wheel drive vehicles, etc. are equipped with drive modes that allow the vehicle to be driven in one or more of two-wheel drive high, four-wheel drive high, four-wheel drive low and AWD. Typically, these types of vehicles employ transfer cases that distribute the drive power received from an output of the vehicle's transmission to a pair of drive shafts. One of the drive shafts drives the vehicle's front wheels, and the other of the drive shafts drives the vehicle's rear wheels. Known transfer cases have employed various types of couplings, such as viscous couplings, electromagnetic clutches, positionable spur gears, etc., that allow the drive power from the transmission to be distributed to the two output shafts of the transfer case to provide the two-wheel drive high, four-wheel drive high, four-wheel high drive low and AWD.

First generation transfer cases employed couplings that could only shift between the various drive modes when the vehicle was stopped. Typically, an adjustable coupling was used to manually shift between drive modes using a mechanical shift actuator. Modern transfer cases sometimes employ synchronizers to synchronize the speed of the input and output shafts of the transfer case prior to shifting between drive modes to allow drive mode shifts while the vehicle is moving.

Various synchronizers have been proposed in the art to provide input and output shaft synchronization of the transfer case. For example, it is known to employ a clutch that translates torque either directly between the input and output shafts of the transfer case, or between the input and output shafts through a planetary gear set. Clutches of this type may be spring-biased, which does not allow a full shift until the relative speeds of the rotating members to be coupled have achieved a certain level of synchronization. However, these known synchronizers typically are complex and add excessive costs to the transfer case. Other transfer cases that employ mechanical shift actuators sometimes fail to provide adequate synchronization prior to the shift, resulting in slip and/or unacceptable shift noises.

In modern transfer cases, mechanical shift actuators have been replaced with electronically controlled shift actuators that are typically operated by an electric motor. In one known transfer case of this type, a reversible DC electric motor is employed to rotate a cammed shift actuator to selectively shift drive gears within the transfer case. A desired drive mode is selected by operating the motor under the control of a microprocessor-based control circuit. The microprocessor commands a motor drive circuit to energize the motor to run in either the clockwise or counter-clockwise direction to achieve the desired drive mode.

In another electronically controlled shift actuator for a transfer case, sensors are employed to sense the speed of the input and output shafts of the transfer case. A microprocessor measures the change in speed over time of each of the input and output shafts, and makes a prediction when the relative speeds of the shafts will be equal. The microprocessor controls a shift actuator at a predetermined time before the shafts are synchronized so that shifting is accomplished when the speeds of the input and output shafts are substantially equal.

SUMMARY OF THE INVENTION

In accordance with the teachings of the present invention, a vehicle transfer case is disclosed that allows shifting between AWD and two-wheel drive at any vehicle speed. The transfer case includes a center differential assembly employing pinion and sun gears that allow the front drive shaft and the rear drive shaft to rotate at different speeds to provide the all-wheel drive function. The transfer case further includes an electrically actuated synchronizer assembly that allows the speed bf the front drive shaft to be synchronized to the speed of the rear drive shaft when shifting from two-wheel drive to all-wheel drive to provide the shift on the fly function. The synchronizer assembly also includes a neutral position where both the front drive shaft and the rear drive shaft are not engaged to the vehicle transmission to allow for vehicle towing.

Additional objects, advantages and features of the present invention will become apparent to those skilled in the art from the following discussion and the accompanying drawings and claims.

DETAILED DESCRIPTION OF THE EMBODIMENTS

The following discussion of the embodiments of the invention directed to a transfer case for an AWD vehicle is merely exemplary in nature, and is in no way intended to limit the invention or its applications or uses.

Figure 1:
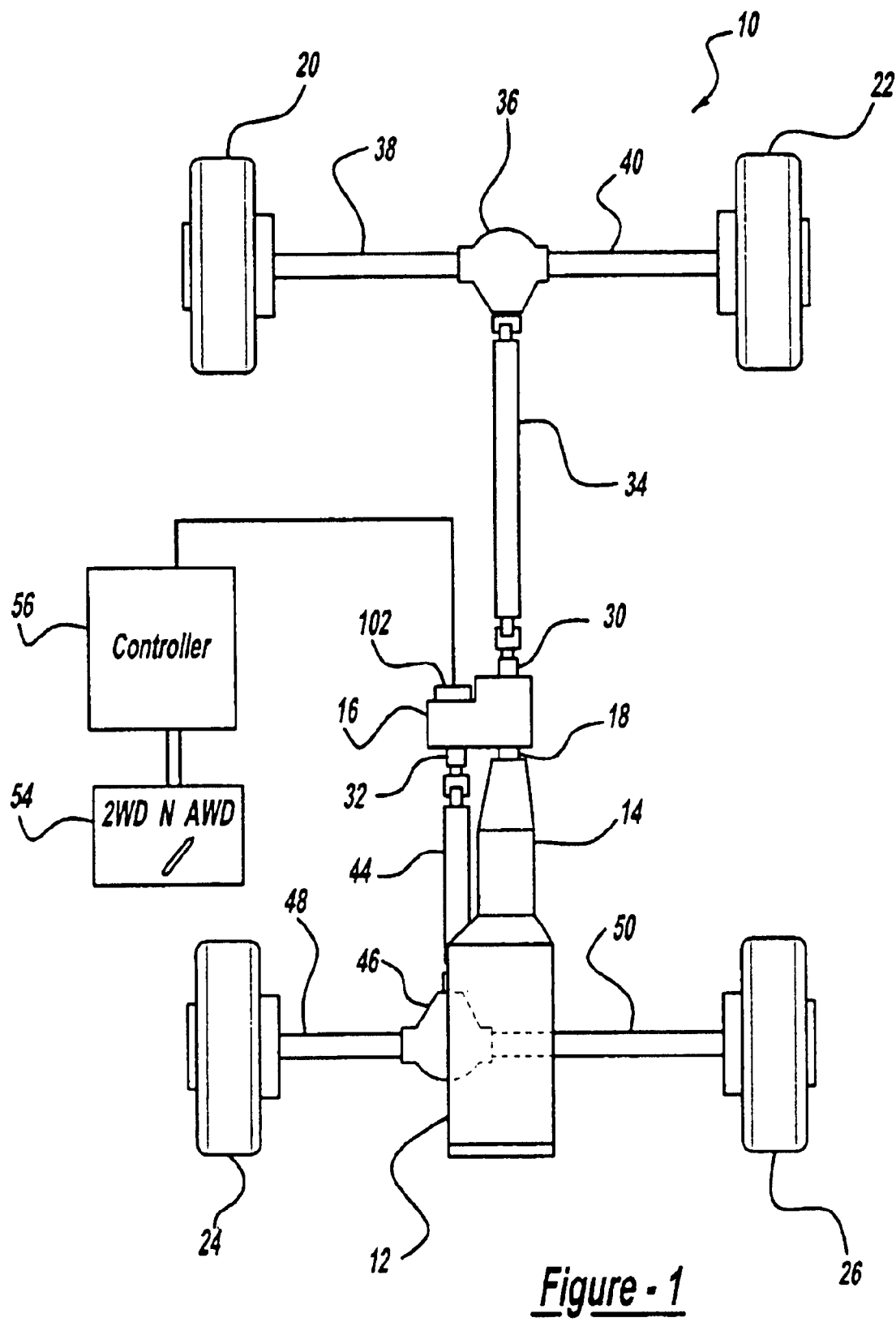
FIG. 1 is a plan view of the drive components of an AWD vehicle employing a transfer case, according to an embodiment of the present invention.

FIG. 1 is a plan view of the drive components of a vehicle 10. The vehicle 10 includes an internal combustion engine 12 that provides the power to drive the vehicle 10, as is well understood in the art. A drive shaft (not shown) is rotated by the engine 12, and is coupled to a transmission 14 that converts the output power from the engine 12 to a selectively geared output. The operation of the engine 12 and the transmission 14 are well understood to those skilled in the art, and need not be discussed in detail here for a proper understanding of the invention.

The output drive power from the transmission 14 is provided to an input shaft 18 of a transfer case 16. The transfer case 16 selectively provides output drive power to a pair of rear wheels 20 and 22 and a pair of front wheels 24 and 26. As will be discussed in detail below, the transfer case 16 allows shifts between two-wheel drive and AWD and vice versa, at any vehicle speed (shift on the fly). In two-wheel drive, drive power is only provided to the rear wheels 20 and 22. The transfer case 16 can also be shifted to neutral, where the transmission 14 is disengaged from the transfer case 16 and the wheels 20–26 can rotate freely for towing and the like.

The transfer case 16 includes a rear output shaft 30 and a front output shaft 32. The rear output shaft 30 is coupled to a rear drive shaft 34, which is coupled to a rear differential 36. A first rear axle 38 is coupled at one end to the differential 36 and at an opposite end to the wheel 20. Likewise, a second rear axle 40 is coupled at one end to the differential 36 and at an opposite end to the wheel 22. The transfer case 16 provides output power on the rear shaft 30, which provides rotational energy to the rear drive shaft 34. This rotational energy is transferred through the rear differential 36 and the axles 38 and 40 to the wheels 20 and 22 in a manner that is well understood in the art.

The front output shaft 32 is coupled to a front drive shaft 44, which is coupled to a front differential 46. A first front axle 48 is coupled at one end to the front differential 46 and at an opposite end to the wheel 24. Likewise, a second front axle 50 is coupled at one end to the front differential 46 and at an opposite end to the wheel 26. Drive energy on the front output shaft 32 drives the front drive shaft 44, and the front differential 46 transfers the drive energy to the wheels 24 and 26 through the front axles 48 and 50.

A switch 54, generally mounted on the dashboard of the vehicle 10, allows the vehicle operator to select the drive mode for two-wheel drive (2WD), AWD or neutral (N). The switch 54 provides a signal to a controller 56 indicating the drive mode selection. The controller 56 provides a control signal to the transfer case 16 to cause the transfer case 16 to make the shift to the desired drive mode, as will be discussed in detail below.

Figure 2:
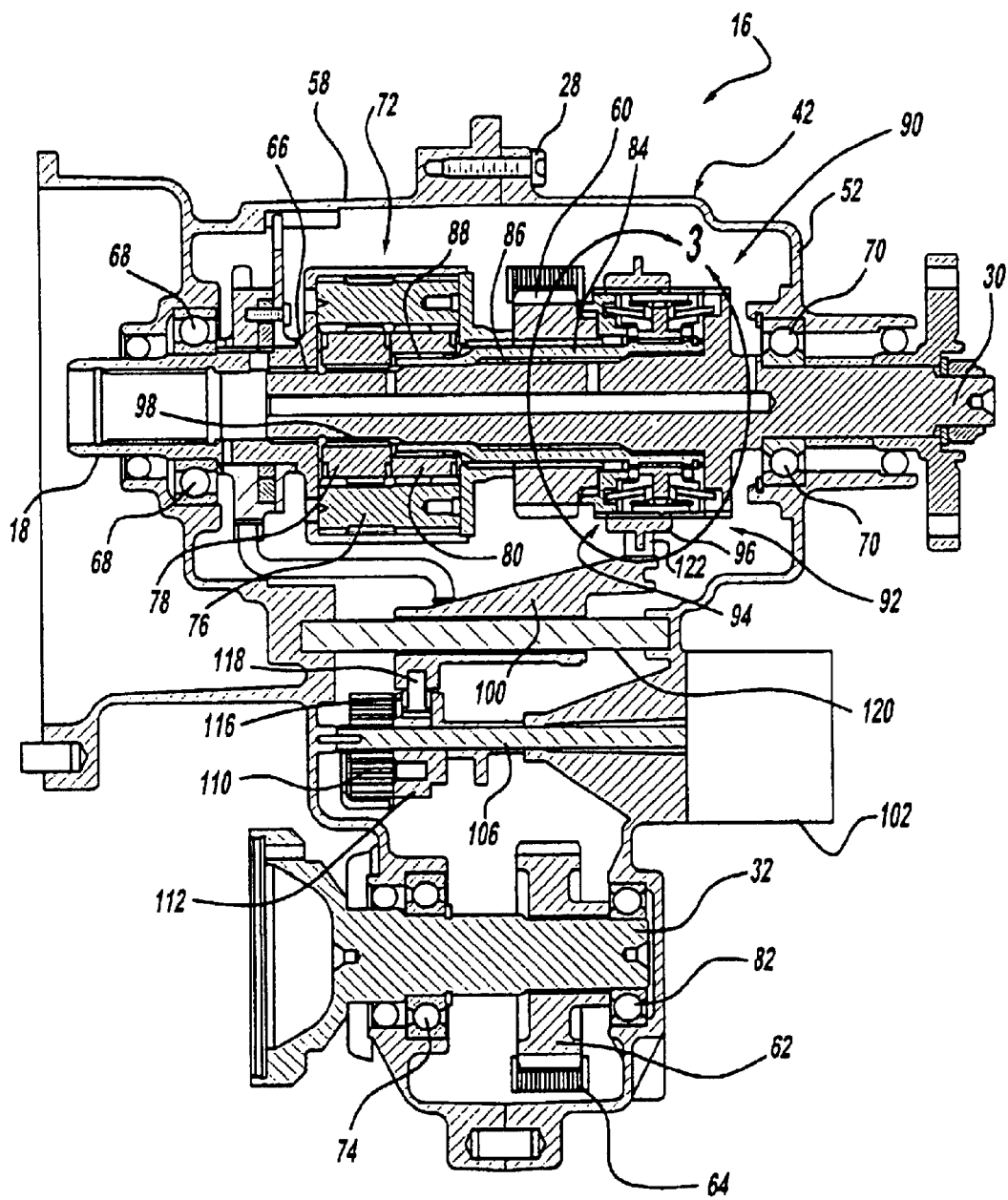
FIG. 2 is a cross-sectional view of the transfer case of the invention shown in FIG. 1.

FIG. 2 is a cross-sectional view of the transfer case 16 separated from the vehicle 10. The input shaft 18, the rear output shaft 30 and the front output shaft 32 extend from an outer housing 42 of the transfer case 16, as shown. The housing 42 includes two housing halves 52 and 58 secured together by bolts 28, as shown. The housing 42 includes various seals, recesses, shoulders, flanges, bores, etc. that accept and position the various components and parts of the transfer case 16 discussed herein. The input shaft 18 is rotatably coupled within the housing 42 on ball bearings 68, and is coupled to one end of the rear output shaft 30 by roller bearings 66 for both the AWD and two-wheel drive modes. The rear output shaft 30 is rotatably mounted on ball bearings 70 at an opposite end from the input shaft 18. The front output shaft 32 is rotatably mounted within the housing 42 on ball bearings 74 and 82.

A rear output sprocket 60 is selectively coupled to a concentric shaft 84 in a manner that will be discussed below to provide power to the front output shaft 30. The concentric shaft 84 is concentric with the output shaft 30 and is independently rotatable on the shaft 30 on roller bearings 86. A front output sprocket 62 is rigidly coupled to the front output shaft 30 and rotates therewith. A chain 64 is coupled to the sprockets 60 and 62. When the transfer case 16 is in the two-wheel drive mode, the sprocket 60 is disengaged from the concentric shaft 84 and rotates independently therefrom so that the front shaft 30 does not rotate. When the transfer case 16 is in the AWD mode, the sprocket 60 is rigidly coupled to the concentric shaft 84 to deliver drive power to the shaft 30 through the sprocket 62 and the chain 64.

A center differential assembly 72 allows variations in drive power percentage from the input shaft 18 to be delivered the rear output shaft 30 and the front output shaft 32. For example, some vehicles may be designed to deliver 50% of the drive power to each of the front and rear shafts 32 and 30 during the AWD mode, and other designs may provide 60% of the drive power to the rear shaft 30 and 40% of the drive power to the front shaft 32 during the AWD mode. Vehicle performance in various types of conditions usually determines the desired distribution of drive power. The differential assembly 72 provides the distribution of drive power, and is set at the time the vehicle is manufactured. The differential assembly 72 in this embodiment is of a known design and such a design can be found, for example, in U.S. Pat. No. 6,203,465 titled "Transfer Case With Four-Wheel Underdrive Operating Mode," assigned to the assignee of this application and herein incorporated by reference. However, as will be appreciated by those skilled in the art, other center differential designs for AWD operation in a transfer case can be employed in the transfer case 16 within the scope of the present invention.

The differential assembly 72 includes a planetary gear assembly having pinion gears 76 coupled to a front sun gear 78 and a rear sun gear 80. The front sun gear 78 is meshed with the pinion gears 76 and with splines 98 associated with the rear output shaft 30. The rear sun gear 80 is meshed with the pinion gears 76 and with splines 88 associated with the concentric shaft 84. The gearing ratio between the front sun gear 78 and the pinion gears 76 and the gearing ratio between the rear sun gear 80 and the pinion gears 76 causes the input shaft 18 to rotate the rear shaft 30 and the concentric shaft 84 at different speeds. Thus, since the front shaft 32 is coupled to the concentric shaft 84 during the AWD mode, the front shaft 32 can rotate at a different speed that the rear shaft 30.

Figure 3:
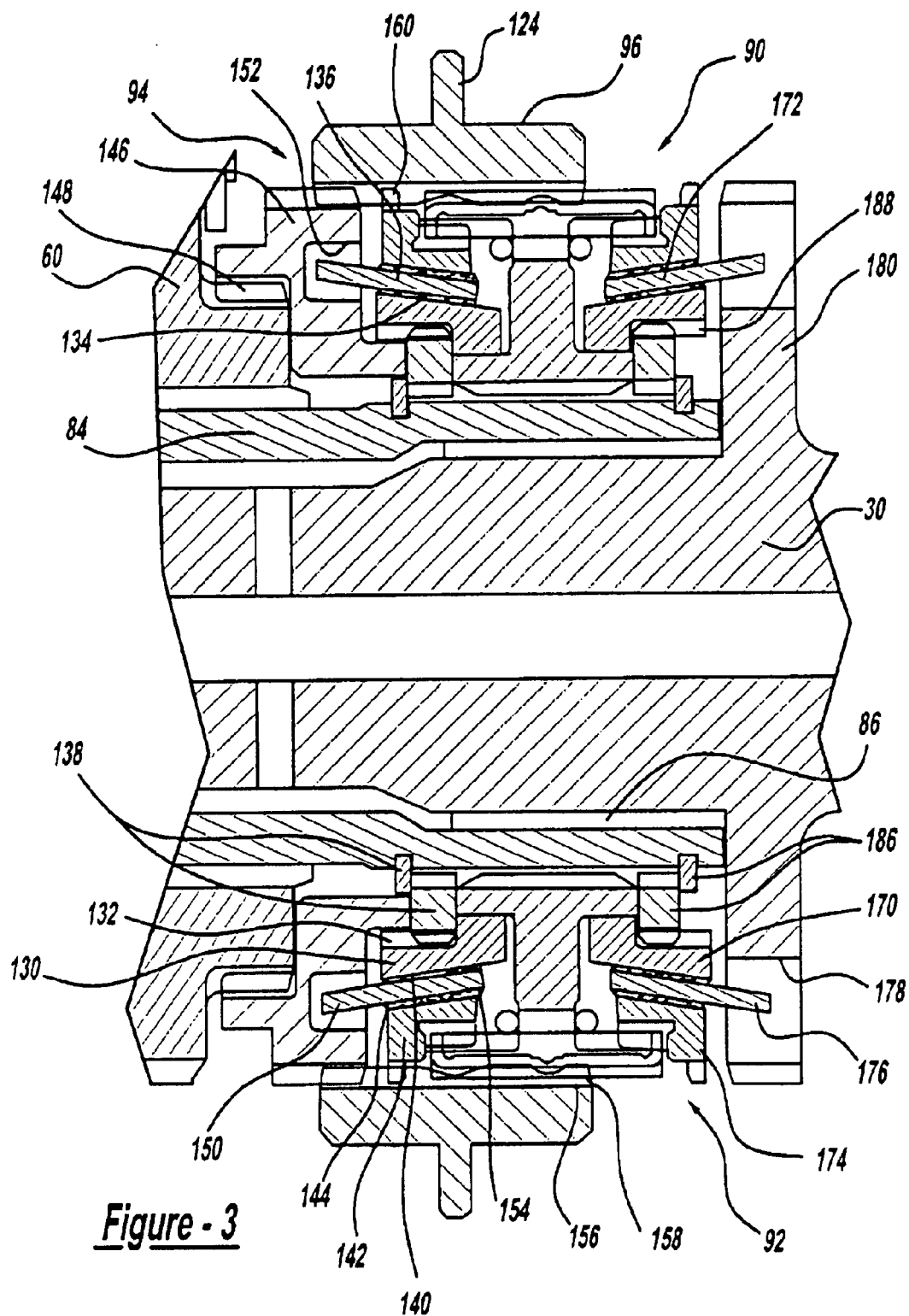
FIG. 3 is a close-up, cross-sectional view of a synchronizer assembly of the transfer case shown in FIG. 2.

According to the invention, the transfer case 16 includes a synchronizer assembly 90 that allows for shifting from two-wheel drive high to AWD at all vehicle speeds. FIG. 3 is a broken-away, cross-sectional view of the transfer case 16 highlighting the synchronizer assembly 90. The synchronizer assembly 90 includes features and components known in the art for synchronizing front and rear output shafts in a transfer case. However, the transfer case 16 combines the synchronizer assembly 90 with the differential assembly 72 to provide shift on the fly between AWD and two-wheel drive, previously unknown in the art. A synchronizer assembly of a similar type as the synchronizer assembly 90 is discussed in U.S. Pat. No. 5,845,754, titled "Shift Synchronizer For Two Speed Transfer Case And The Like," assigned to the assignee of this application and herein incorporated by reference.

The synchronizer assembly 90 includes a two-wheel drive synchronizer 92 and an AWD synchronizer 94. The two-wheel drive synchronizer 92 is optional and may have benefits in certain driving conditions. The synchronizer assembly 90 further includes a shift collar 96 that activates the synchronizer 92 and the synchronizer 94 in a manner that will be discussed below. The shift collar 96 is a cylindrical element that slides in an axial direction relative to the rear shaft 30. A shift fork 100 is coupled to the shift collar 96 and slides the shift collar 96 to engage the synchronizer 92 or 94 from an operator command. The shift collar 96 is shown in the position where the AWD synchronizer 94 is engaged and the two-wheel drive synchronizer 92 is not engaged. In this position, the sprocket 60 is coupled to the concentric shaft 84.

A DC motor 102 coupled to the housing 42 activates the shift fork 100. When the vehicle operator switches the switch 54, the controller 56 activates the motor 102. The motor 102 rotates a shift shaft 106 in the proper direction. The shift shaft 106 is coupled to a clock spring 110 at an opposite end from the motor 102. A cylindrical cam 112 is mounted to the shift shaft 106 between the spring 110 and the motor 102. The spring 110 provides a resilient coupling between the shift shaft 106 and the cam 112 to absorb lag between the motor 102 and its drive components. In other words, the spring 110 provides an energy storing interconnection between the motor 102 and the shift fork 100. The cam 12 includes a helical track 116 that receives a pin and cam follower assembly 118. The follower assembly 118 is coupled to the shift fork 100 and the shift fork 100 slides along a fork shaft 120 mounted to the housing 42. The shift fork 100 includes a caliper 122 having a groove (not shown). The shift collar 96 includes an annular outer ridge 124 that is positioned within the caliper groove. Thus, when the shift fork 100 slides in a translational direction, the shift collar 96 slides in combination therewith.

The AWD synchronizer 94 includes an inner hub 130 that is rigidly secured to the concentric shaft 84 by splines 132 and inserts 138 so that it rotates with the concentric shaft 84. The inner hub 130 includes a cone shaped outer surface 134. The synchronizer 94 further includes a cone sleeve 136 having a roughened cone-shaped inner surface 140 adjacent the outer surface 134, and a roughened outer cone shaped surface 144. The synchronizer 94 further includes an outer sleeve 142 having an inner roughened surface 154 adjacent the outer roughened surface 144 of the cone sleeve 136. The sprocket 60 is coupled to a coupler 146 by splines 148 and rotates therewith. The cone sleeve 136 includes tabs 150 that are positioned within associated openings 152 in the coupler 146 so that the sprocket 60, the coupler 146 and the cone sleeve 136 are coupled together and rotate independently of the outer sleeve 142, the concentric shaft 84 and the inner hub 130 when the synchronizer 94 is disengaged and the vehicle 10 is in two-wheel drive mode.

When the vehicle operator shifts the switch 52 from the two-wheel drive position to the AWD position, the shift fork 100 slides the shift collar 96 towards the outer sleeve 142. An inner surface 156 of the shift collar 96 includes splines 158 that mesh with splines 160 on an outer surface of the outer sleeve 142. As the shift collar 96 continues to move, the inner surface 154 of the outer sleeve 142 contacts the outer surface 144 of the cone sleeve 136 so that the outer sleeve 142, the cone sleeve 136, the coupler 146 and the sprocket 60 are all coupled together. As the shift collar 96 continues to move, the inner surface 140 of the cone sleeve 136 contacts the outer surface 134 of the inner hub 130, causing the combination of the cone sleeve 136, the outer sleeve 142, the coupler 146 and the sprocket 60 to begin to rotate at the speed of the concentric shaft 84. As the shift collar 96 continues to move, the sprocket 60 thus begins to move at the speed of the concentric shaft 84. When the shift collar 96 reaches its final AWD position, straight-cut teeth in the inner hub 130 couple with associated teeth in the coupler 146 to lock the entire assembly together. Thus, when the shift collar 96 is in its final AWD position, the front output shaft 32 is rotating at the same speed as the concentric shaft 84.

The two-wheel drive synchronizer 92 also includes an inner hub 170, a cone sleeve 172 and an outer sleeve 174. The cone sleeve 172 includes tabs 176 positioned within slots 178 in a circumferential flange 180 of the output shaft 30. The synchronizer 92 also includes inserts 186 rigidly mounted to the concentric shaft 84. The inserts 186 are mounted to splines 188 associated with the inner hub 170. Therefore, the inner hub 170 also rotates in combination with the concentric shaft 84 as does the inner hub 130. When the shift collar 96 is in the two-wheel drive position, the outer sleeve 174 is pushed against the cone sleeve 172, which in turn pushes against the inner hub 170 in the same manner as discussed above for the synchronizer 94. Therefore, in the two-wheel drive position, the rear output shaft 30 rotates at the same speed as the concentric shaft 84.

When the shift collar 96 is positioned between the synchronizers 92 and 94, then neither of the synchronizers 92 and 94 are engaged and the wheels 20–26 can rotate freely for towing. In this position, the inner hub 130 and the inner hub 170 are disengaged from the cone sleeve 172. Thus, the sprocket 60 and the rear output shaft 30 are disengaged from the concentric shaft 84.

The foregoing discussion describes merely exemplary embodiments of the present invention. One skilled in the art would readily recognize that various changes, modifications and variations can be made therein without departing from the spirit and scope of the invention as defined in the following claims.

What is claimed is:

1. A transfer case for shifting a vehicle drive mode between all-wheel drive and two-wheel drive, said transfer case comprising:

an in put shaft;

a first drive shaft coupled to the input shaft, wherein the first drive shaft is engaged for both two-wheel drive and all-wheel drive;

a second drive shaft coupled to the first drive shaft, wherein the second drive shaft is engaged for all-wheel drive;

a center differential assembly coupled to the first drive shaft, said center differential assembly allowing different drive powers to be provided to the first drive shaft and the second drive shaft; and a synchronizer assembly, said synchronizer assembly shifting the transfer case between two-wheel drive and all-wheel drive at any vehicle speed;

wherein the synchronizer assembly includes a two-wheel drive synchronizer and an all-wheel drive synchronizer.

2. The transfer case according to claim 1 wherein the synchronizer assembly is actuated by an electric motor.

3. The transfer case according to claim 1 wherein the synchronizer assembly includes a shift fork, said shift fork shifting a shift collar between a two-wheel drive position and an all-wheel drive position.

4. The transfer case according to claim 1 wherein the second drive shaft is coupled to the first drive shaft by a chain and associated sprockets.

5. The transfer case according to claim 1 wherein the differential assembly is a planetary gear differential assembly.

6. The transfer case according to claim 1 wherein the differential assembly includes a plurality of pinion gears, a first sun gear and a second sun gear.

7. The transfer case according to claim 6 wherein the first sun gear is coupled to a concentric shaft, said concentric shaft being concentric with the first drive shaft and being rotatable at a different speed than the first drive shaft.

8. The transfer case according to claim 1 wherein the second drive shaft is coupled to the first drive shaft through a concentric shaft and the differential assembly, said concentric shaft being concentric with the first drive shaft.

9. The transfer case according to claim 1 wherein the synchronizer assembly includes a neutral position where neither the first drive shaft nor the second drive shaft is engaged.

10. The transfer case according to claim 1 wherein the synchronizer assembly includes an inner hub rigidly secured to a concentric shaft, a cone sleeve slidably engageable with the inner hub and an outer sleeve slidably engageable with the cone sleeve, said concentric shaft being concentric with the first drive shaft.

11. The transfer case according to claim 1 wherein the first drive shaft is a rear drive shaft of the Vehicle and the second drive shaft is a front drive shaft of the vehicle.

12. A transfer case for shifting a vehicle drive mode between all-wheel drive and two-wheel drive, said transfer case comprising:

an input shaft;

a rear drive shaft coupled to the input shaft, wherein the rear drive shaft is engaged for both two-wheel drive and all-wheel drive;

a front drive shaft coupled to the rear drive shaft, wherein the front drive shaft is engaged for all-wheel drive;

a concentric shaft coupled to the front drive shaft when the vehicle is in the all-wheel drive mode, said concentric shaft being concentric with the rear drive shaft and being rotatable at a different speed than the rear drive shaft;

a center differential assembly coupled to the rear drive shaft and the concentric shaft, said front drive shaft being coupled to the rear drive shaft through the concentric shaft and the center differential assembly, said center differential assembly allowing different drive powers to be provided to the front drive shaft and the rear drive shaft; and a synchronizer assembly, said synchronizer assembly shifting the transfer case between two-wheel drive and all-wheel drive at any vehicle speeds wherein the synchronizer assembly includes a two-wheel drive synchronizer and an all-wheel drive synchronizer.

13. The transfer case according to claim 12 wherein the differential assembly includes a planetary gear assembly having a plurality of pinion gears, a front sun gear and a rear sun gear, wherein the front sun gear is coupled to the rear drive shaft and the rear sun gear is coupled to the concentric shaft.

14. The transfer case according to claim 12 wherein the front drive shaft is coupled to the concentric shaft by a chain and associated sprockets.

15. The transfer case according to claim 12 wherein the synchronizer assembly includes an inner hub rigidly secured to the concentric shaft, a cone sleeve slidably engageable with the inner hub and an outer sleeve slidably engageable with the cone sleeve.

16. The transfer case according to claim 12 wherein the synchronizer assembly includes a neutral position where neither the rear drive shaft nor the front drive shaft is engaged.

17. The transfer case according to claim 12 wherein the synchronizer assembly is actuated by an electric motor.

18. The transfer case according to claim 12 wherein the synchronizer assembly includes a shift fork, said shift fork shifting a shift collar between a two-wheel drive position and an all-wheel drive position.

19. A transfer case for shifting a vehicle drive mode between all-wheel drive and two-wheel drive, said transfer case comprising:

an input shaft;

a rear drive shaft coupled to the input shaft, wherein the rear drive shaft is engaged for both two-wheel drive and all-wheel drive;

a front drive shaft coupled to the rear drive shaft, wherein the front drive shaft is engaged for all-wheel drive;

a concentric shaft coupled to the front drive shaft when the vehicle is in the all-wheel drive mode, said concentric shaft being concentric with the rear drive shaft and being rotatable at a different speed than the rear drive shaft;

a center planetary gear differential assembly coupled to the rear drive shaft and the concentric shaft, said front drive shaft being coupled to the rear drive shaft through the concentric shaft and the center differential assembly, said differential assembly including a plurality of pinion gears, a front sun gear and a rear sun gear, wherein the front sun gear is coupled to the rear drive shaft and the rear sun gear is coupled to the concentric shaft, said center differential assembly allowing different drive powers to be provided to the front drive shaft and the rear drive shaft;

a synchronizer assembly including an inner hub rigidly secured to the concentric shaft, a cone sleeve slidable engageable with the inner hub and an outer sleeve slidably engageable with the cone sleeve, said synchronizer assembly further including a shift fork and a shift collar, said shift fork shifting the shift collar between a two-wheel drive position and an all wheel drive position, said shift collar engaging the outer sleeve to provide the synchronization, said synchronizer assembly shifting the transfer case between two-wheel drive and all-wheel drive at any vehicle speed; and an electric motor actuating the shift fork from an operator command to shift the transfer case;

wherein the synchronizer assembly includes a two-wheel drive synchronizer and an all-wheel drive synchronizer.

20. The transfer case according to claim 19 wherein the front drive shaft is coupled to the concentric shaft by a chain and associated sprockets.

21. The transfer case according to claim 19 wherein the synchronizer assembly includes a neutral position where neither the rear drive shaft or the front drive shaft is engaged.

* * * * *

UNITED STATES PATENT AND TRADEMARK OFFICE
CERTIFICATE OF CORRECTION

PATENT NO. : 6,814,682 B2
DATED : November 9, 2004
INVENTOR(S) : Ralph J. Spitale It is certified that error appears in the above-identified patent and that said Letters Patent is hereby corrected as shown below:

Column 2,
Line 19, "bf" should be -- of --.

Column 4,
Line 29, "that" should be -- than --.

Column 6,
Line 21, "in put" should be -- input --.

Column 7,
Line 5, "Vehicle" should be -- vehicle --.
Line 30, "speeds" should be -- speed; --.

Column 8,
Line 31, "slidable" should be -- slidably --.

Signed and Sealed this

Second Day of August, 2005

JON W. DUDAS
*Director of the United States Patent and Trademark Office*